United States Patent [19]

Gray et al.

[11] 3,876,058

[45] Apr. 8, 1975

[54] CONVEYING APPARATUS

[75] Inventors: John McCutcheon Gray, Prescot; David Ormerod Mansell, Ormskirk, both of England

[73] Assignee: Pilkington Brothers Limited, Liverpool, England

[22] Filed: Oct. 17, 1972

[21] Appl. No.: 298,385

[30] Foreign Application Priority Data
Oct. 19, 1971 United Kingdom............... 48649/71

[52] U.S. Cl.............................. 198/34; 198/127 R
[51] Int. Cl............................................ B65g 46/26
[58] Field of Search........ 198/30, 167; 271/52, 198, 271/167, 30, 34, 127, 193, 36, 37, 64, 251

[56] References Cited
UNITED STATES PATENTS

| | | | |
|---|---|---|---|
| 1,032,239 | 7/1912 | Player.................................. | 198/167 |
| 3,138,238 | 6/1964 | De Good et al. ................ | 198/127 R |
| 3,370,844 | 2/1968 | Roberts............................... | 271/52 |
| 3,386,559 | 6/1968 | Ross..................................... | 198/30 |
| 3,561,588 | 2/1971 | Nash..................................... | 198/30 |
| 3,570,648 | 3/1971 | Gillespie............................ | 198/167 |

Primary Examiner—Evon C. Blunk
Assistant Examiner—Jeffrey V. Nase
Attorney, Agent, or Firm—Burns, Doane, Swecker & Mathis

[57] ABSTRACT

A conveyor conveys a sheet member in a forward direction past a plurality of wheels rotatable about axes inclined to the forward direction. The wheels are mounted above the sheet and may be lowered to engage frictionally the upper surface of the sheet and thereby effect a side-ways shift as the sheet is moved forwards by the conveyor.

12 Claims, 5 Drawing Figures

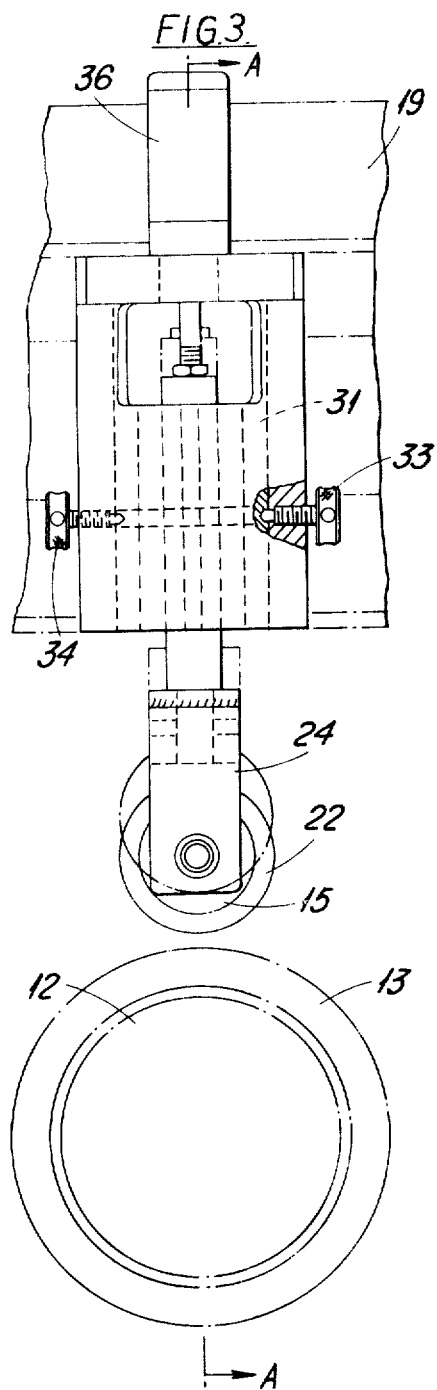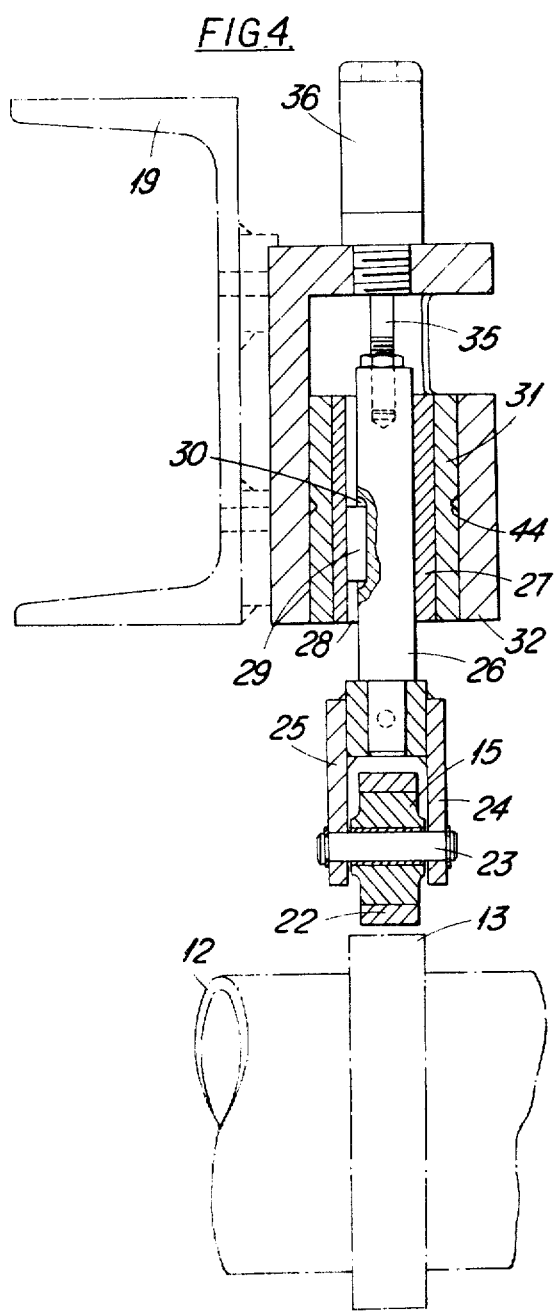

CONVEYING APPARATUS

BACKGROUND OF THE INVENTION

The invention relates to conveying apparatus and in particular to apparatus for effecting a side-ways shift of a sheet member while simultaneously moving forwards along a conveying path. The invention is particularly applicable to the handling of glass sheets.

When glass is produced as a ribbon, desired lengths are cut from the ribbon and smaller plates may then be formed by splitting the sheets along a centre line parallel to the length of the ribbon. It may be desirable to effect lateral separation between the two plates formed by such centre splitting in order to prevent edge damage, or to compensate for wander of the ribbon along the line of the conveying path or to assist subsequent separation of the plates prior to subsequent operations such as stacking. It is an object of the present invention to provide improved apparatus for effecting a side-ways shift of a sheet member which may be used for example in the handling of glass sheets.

SUMMARY OF THE INVENTION

The invention provides apparatus for effecting a side-ways shift of a sheet member while simultaneously moving forwards along a conveying path, which apparatus comprises conveyor means to convey the sheet member in a forward direction, a plurality of rotary members each operable to engage frictionally a surface of the sheet while it is being conveyed forwardly on the conveyor means and effective to produce movement of the sheet with a component in a direction transverse to said forward direction, and actuating means operative to move said plurality of rotary members into and out of engagement with a sheet member when required, thereby to effect a desired side-ways shift of the sheet member on the conveyor means.

Preferably said plurality of rotary members comprise a series of wheels rotatable about parallel axes inclined to said forward direction. The use of wheels is particularly advantageous in that the direction of their axes of rotation can each be adjusted to vary the extent of side-ways shift achieved.

Preferably said conveyor means is arranged to convey the sheets lying in a substantially horizontal plane along a substantially horizontal path, and said wheels are mounted above and can be lowered into engagement with a sheet member on the conveyor means, and can be raised out of engagement with such sheet member. The wheels may be freely rotatable.

The conveyor means may conveniently comprise a series of tyred rollers and in order to avoid distortion of the sheet when the wheels are urged against the upper surface of the sheet, it is preferable for each wheel to be located immediately above a tyre so as to sandwich the sheet member between the wheel and tyre.

The conveyor means may be adapted to convey a group of at least two sheet members side-by-side and the rotary members arranged to engage the surface of one of the sheet members to move that sheet member laterally with respect to another sheet member of the group. In order to obtain maximum lateral separation between two adjacent sheet members, the apparatus may include two sets of rotary members arranged at positions across said conveyor means, so that one set of rotary members engages the surface of one sheet of the group and the other set of rotary members engages the surface of another sheet of the group, the two sets of rotary members being adapted to move the respective sheet members engaged thereby in opposite lateral directions, thereby to produce a desired separation between the sheet members.

BRIEF DESCRIPTION OF THE DRAWINGS

FIG. 3 is a side view of part of the apparatus shown in FIG. 1;

FIG. 4 is a section on the line A—A in FIG. 3; and

DESCRIPTION OF THE PREFERRED EMBODIMENTS

Figure 1:
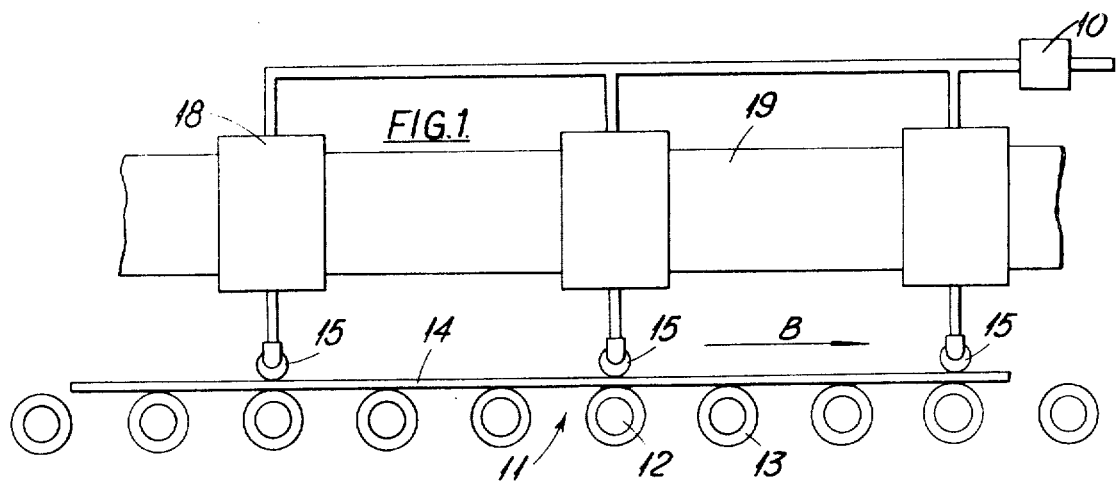
FIG. 1 is a schematic side view of conveyor apparatus embodying the invention.
Figure 2:
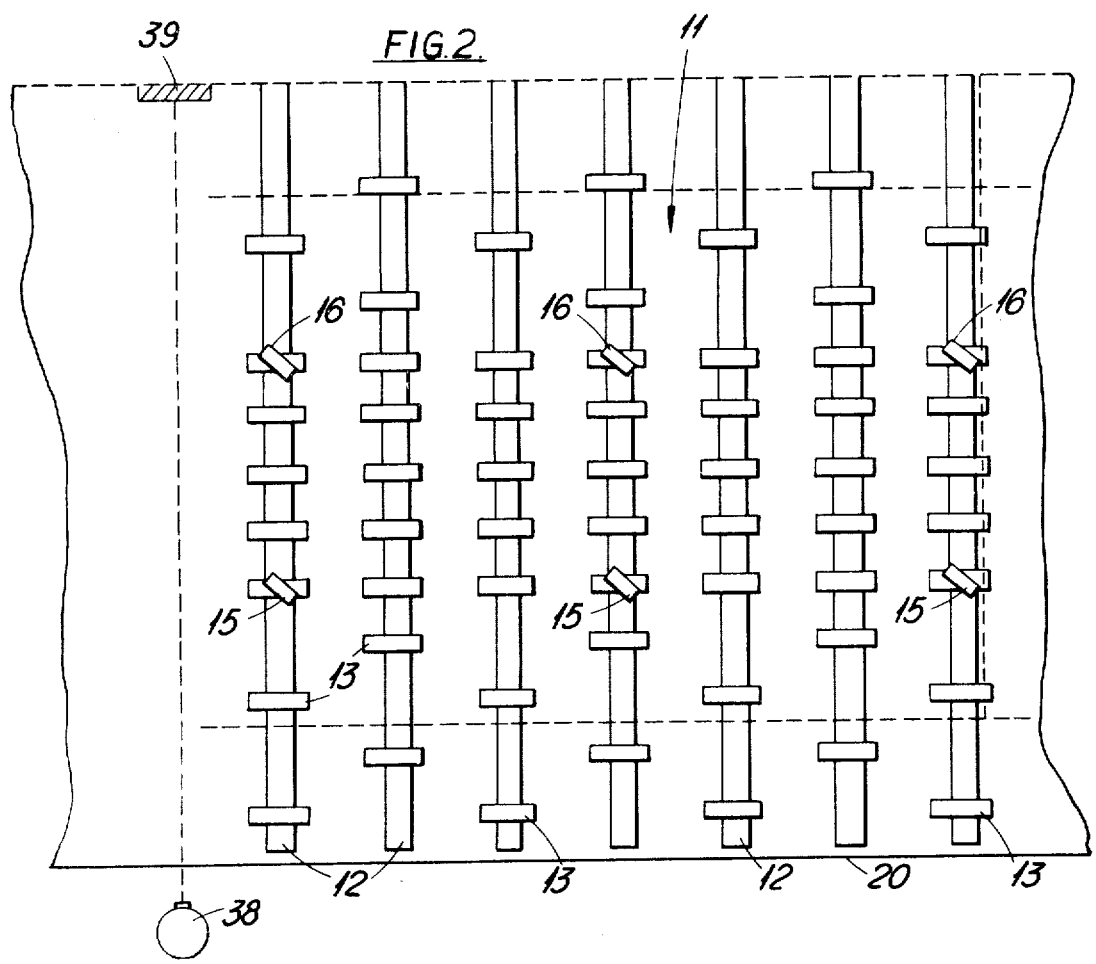
FIG. 2 is a plan view of the apparatus shown in FIG. 1.

As is shown in FIGS. 1 and 2, the apparatus includes a roller conveyor 11 consisting of a plurality of driven rollers 12 rotating about parallel horizontal axes. Each roller has a plurality of tyres 13 at spaced intervals along its length. A glass sheet 14, lying in a horizontal plane, is conveyed on top of the tyres 13 along a substantially horizontal forward path in the direction of the arrow B in FIG. 1. Positioned above the conveyor 11 are two series of surface engaging wheels. One series consists of three wheels 15 spaced apart in line along the length of the conveyor path. The other series consists of a similar three wheels 16 also spaced apart along the length of the conveyor path. As is shown in FIG. 2, the wheels 15 and 16 are spaced apart across the width of the conveyor with each wheel 16 being aligned with a wheel 15 above one of the rollers 12. Each of the wheels 15 and 16 is located immediately above a tyre 13 on one of the rollers 12. As is shown in FIG. 2, each of the wheels 15 and 16 is arranged to rotate about a horizontal axis inclined to the forward direction of the conveyor path. In the example shown, the angle of inclination is approximately 45°. The wheels 15 and 16 are mounted on pneumatic actuating devices 18 secured to a common support frame 19. The actuating devices 18 are connected to a common pneumatic supply controlled by a valve 10 so that all the wheels mounted on the frame 19 are raised or lowered simultaneously. The wheels 15 and 16 may be raised to a position such that the glass sheet 14 may pass along the conveyor 11 out of contact with the wheels 15 and 16. On the other hand, the wheels can be lowered so as to engage frictionally the upper surface of the glass sheet and cause a lateral shift towards the datum edge 20 of the conveyor shown in FIG. 2.

Each of the wheels 15 and 16 is similarly constructed and mounted. Only one wheel 15 will be described in detail with reference to FIGS. 3 and 4. The wheel 15, which has a rubber cover 22, is freely rotatable on a pin 23 extending between two mounting plates 24 and 25. The plates are secured to the lower end of a cylindrical rod 26 slidably mounted in a bush 27 formed of plastics material. The bush is provided with a key-way 28 and the rod 26 is held in a fixed angular position relative to the bush 27 by a key member 29 engaging a recess 30 in the rod 26 as well as the key-way 28. The bush 27 is secured by adhesive within a coaxial sleeve 31. The sleeve 31 is rotatable within a surrounding mounting bracket 32 which is secured to the support frame 19. The axis of rotation of the wheel 15 can be adjusted relative to the direction of the conveying path by adjusting the rotation of the sleeve 31 within the mounting bracket 32. The position, when suitably adjusted, can be locked by two screw members 33 and 34 which pass through the mounting bracket 32 and engage an annular recess 44 in the sleeve 31. The upper end of the rod 26 is secured by a connecting rod 35 to a pneumatic piston and cylinder device 36. Air is supplied to the device 36 from a source not shown and controlled by an electrically operated solenoid valve.

In order to detect the approach of a sheet of glass towards the lateral shifting mechanism, an optical sheet detector is provided to the left of the rollers 12 shown in FIG. 2. This detector comprises a light source and detector 38 positioned to one side of the conveyor 11. A reflector 39 is positioned on the upper side of the conveyor so that when no glass sheet is interposed between the light source and reflector, the light detector detects reflected light to indicate no glass sheet is present. When a sheet passes between the source and reflector, the reflected beam is interrupted and the change in signal from the detector 38 is used to control the operation of the solenoid valves controlling the piston and cylinder device 36. A timer unit, not shown, is coupled to the solenoid valves so as to provide a variable delay both to the time interval between a signal from the detector 38 and the solenoid valve being activated, and also to the length of time that the solenoid valve is activated.

In use, the wheels 15 and 16 are normally raised as glass sheets move along the conveyor in the direction of the arrow B. Each sheet in turn is detected by the optical detector 38 and if it is required to shift the sheet laterally towards the datum edge 20, the signal from the detector 38 is used to effect simultaneous lowering of all the wheels 15 and 16 onto the glass sheet when it is below them. The timing unit controlling the delay in operation of the solenoid valves after the appropriate signal from the detector 38, is adjusted so that the wheels 15 and 16 are lowered immediately the leading edge of the glass sheet has passed under the downstream set of wheels 15 and 16. In this way, the maximum period of side thrust is given to the plate whilst it is passing under the pressure wheels. The timing unit causes the wheels 15 and 16 to be raised before the trailing edge of the glass sheet has passed under the upstream set of pressure wheels 15 and 16. In this way, the glass sheet is displaced laterally but remains parallel with the direction of the conveying path. The operation is repeated on successive sheets passing along the conveyor.

The extent of lateral displacement depends on the air pressure supplied to the piston and cylinder devices 36 (this in turn controls the pressure applied by the wheels 15 and 16 to the glass sheet), the length of time that the wheels 15 and 16 are in contact with the glass sheet, the inclination of the axis of rotation of the wheels 15 and 16 to the line of the conveyor, and the coefficient of friction between the glass sheet and the tyres engaging it. In one particular example, the air pressure supplied may be variable up to about 7 bars. The speed of the conveyor 11 may be such that the wheels 15 and 16 contact the glass plate for between 0.2 and 2.5 seconds. The axis of rotation of the wheels 15 and 16 may be adjusted between 0° and 45° to the axis of the rollers 12, on either side of the line of conveyor travel. Angles of between 10° and 40° have been found particularly suitable. The tyres on the wheels 15 and 16 and on the rollers 12 may be made of nitrile rubber 50° Shore A scale. Increased lateral shift can be achieved by providing a low coefficient of friction covering on the tyres 13 on the conveyor rollers 12. Such a low friction covering can be achieved by securing polytetrafluoroethylene tape around the peripheries of the tyres.

The invention is not restricted to the details of the foregoing example. The part of the conveyor shown in FIG. 2 may form the right hand half of a conveyor providing two conveying paths side-by-side. In this way, two sheets may be conveyed side-by-side, one passing under the lateral shifting mechanism shown in FIG. 2 while the other sheet passes the shifting mechanism on the other half of the conveyor.

Figure 5:
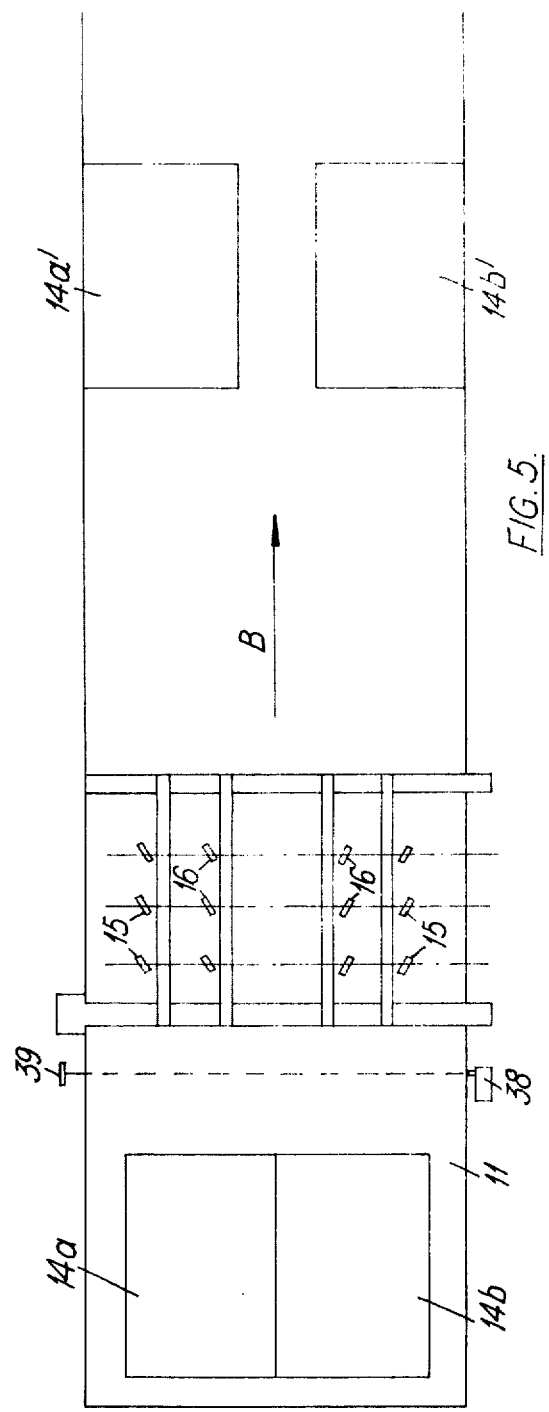
FIG. 5 is a plan view of another embodiment of the invention.

Such an arrangement is shown in FIG. 5 where the reference numerals used are similar to those in FIGS. 1 and 2. Two separate sheets 14a and 14b, formed by cutting a larger sheet along its centre line, are conveyed side-by-side on a roller conveyor 11, towards a separating station 50. Both halves of the conveyor at the separating station 50 have sets of wheels 15 and 16 similar to those described with reference to FIGS. 1 to 4. The wheels on the left hand half of the conveyor are inclined so as to shift the sheet 14a to the left whereas the wheels on the right hand half of the conveyor are inclined in the opposite direction so as to shift the sheet 14b to the right. In this way the sheets 14a and 14b can be simultaneously moved away from each other towards the outside edges of the conveyor as shown at 14a' and 14b'.

The lateral shifting mechanism described above may form only one stage of a succession of lateral shifting operations. In this case, the arrangement shown in FIG. 2 or FIG. 5 may be followed by a further lateral shifting mechanism at a downstream position on the conveyor. Such succession may include a plurality of lateral shifting mechanisms of the form described above disposed at positions spaced along the conveyor and actuated sequentially so that each successive mechanism is effective to increase the overall distance by which a sheet is laterally shifted, and in particular to increase the separation between side-by-side sheets.

The separation between successive wheels 15 (and similarly between wheels 16) along the support beam 19 is preferably adjustable so that the pitch can be varied to suit differing plate lengths for the glass sheets.

It will be appreciated that the number of wheels along the support beam can be selected to suite particular requirements and that the shown number of three is given solely by way of illustration and example. It has been found in practice, by way of example, that three wheels at a spacing of about 12 inches is a suitable arrangement for plate lengths of about 108 inches.

Instead of using the optical detector 38 to detect the presence of a glass sheet, other detectors may be used, such as a spring mounted finger located in the path of the sheet and arranged to be depressed by a sheet and thereby operate a switch.

We claim:

1. Apparatus for conveying two glass sheets and effecting a desired lateral separation therebetween while simultaneously moving the sheets forward along a conveying path, comprising:

a first conveyor section for conveying the two sheets side by side in a forward conveying path direction;

a second, separating conveyor section, downstream of said first conveyor section and operable to receive the sheets side by side from said first conveyor section and to effect a sideways shift of at least one of said sheets while simultaneously moving the sheets forward along the conveying path direction, said second conveyor section comprising:

driven conveyor means for conveying said at least one of said sheets in said forward conveying path direction, rotary means comprising a plurality of freely rotatable rotary members, rotatable about axes canted with respect to said forward conveying path direction, for selectively frictionally engaging a surface of the at least one sheet while it is being conveyed forwardly on the driven conveyor means, said freely rotatable rotary members being operable, while freely rotating, in cooperation with said conveyor means to urge the at least one sheet bodily in a direction transverse to said forward direction, actuating means operative to move said plurality of rotary members into and out of engagement with the at least one sheet member when required, thereby to effect a desired sideways shift of the at least one sheet member on the driven conveyor means; and means establishing a parallel conveying path for conveying the other of said sheets in said separating conveyor section in said forward conveying path direction; and a third conveyor section, downstream of said second conveyor section, for receiving the separated sheets from said second conveyor section and conveying the separated sheets in the forward conveying path direction.

2. The apparatus according to claim 1 wherein said means defining a parallel conveying path for conveying the other of said sheets in said separating conveyor section comprises:

driven conveyor means for conveying said other of said sheets in said forward conveying path direction;

second rotary means comprising a second plurality of freely rotatable rotary members, rotatable about axes canted with respect to said forward conveying path direction, for selectively frictionally engaging a surface of the said other sheet while it is being conveyed forwardly on the driven conveyor means, said second freely rotatable rotary members being operable, while freely rotating, in cooperation with said conveyor means to urge said other sheet bodily in a direction transverse to said forward direction and generally opposite to the transverse shifting direction of said at least one sheet; and second actuating means operative to move said second plurality of rotary members into and out of engagement with said other sheet member when required.

3. Apparatus according to claim 2 including:

support means for supporting said rotary members, the support means being located above the forward conveying paths.

4. Apparatus according to claim 1, wherein said plurality of rotary members are located at positions spaced along the path of travel of sheet members in said forward direction.

5. Apparatus according to claim 1, wherein said plurality of rotary members comprise a series of wheels, the wheels being freely rotatable about parallel horizontal axes inclined to said forward direction.

6. Apparatus according to claim 5, wherein each of said conveyor sections is arranged to convey sheet members lying in a substantially horizontal plane along a substantially horizontal path, and said wheels are mounted above and can be lowered into engagement with said at least one sheet member on said driven conveyor means, and can be raised out of engagement with such sheet member.

7. Apparatus according to claim 5, including a plurality of series of wheels, the wheels in each series being spaced along the path of travel of sheet members in said forward direction, and the series of wheels being spaced apart in a direction transverse to said forward direction.

8. Apparatus according to claim 5, in which the inclination of the axis of rotation of each wheel is adjustable.

9. Apparatus according to claim 5, wherein said conveyor means comprises a series of tyred rollers, and each wheel is located above a tyre so as to sandwich a sheet member between the wheel and tyre.

10. Apparatus according to claim 1, wherein pneumatic means is provided for actuating each rotary member and urging it into engagement with the sheet.

11. Apparatus according to claim 10, wherein the pneumatic means for actuating each rotary member are connected to a common air supply so that the rotary members are raised or lowered simultaneously.

12. Apparatus according to claim 1, comprising detector means operative to detect the position of an advancing sheet member on the conveyor means, and wherein said actuating means is operated in response to a signal from the detector means.

* * * * *